United States Patent
Kirsanov

(10) Patent No.: US 12,299,607 B1
(45) Date of Patent: May 13, 2025

(54) EFFICIENT PARAMETER SELECTION FOR CLIENT-CREATED PRIVATE JET SEGMENTS

(71) Applicant: JetSmarter Inc., Fort Lauderdale, FL (US)

(72) Inventor: Mikhail Kirsanov, Fort Lauderdale, FL (US)

(73) Assignee: JetSmarter Inc., Fort Lauderdale, FL (US)

( * ) Notice: Subject to any disclaimer, the term of this patent is extended or adjusted under 35 U.S.C. 154(b) by 0 days.

(21) Appl. No.: 17/482,739

(22) Filed: Sep. 23, 2021

Related U.S. Application Data

(60) Provisional application No. 63/082,158, filed on Sep. 23, 2020.

(51) Int. Cl.
*G06Q 10/02* (2012.01)
*G06Q 30/0283* (2023.01)
*G06Q 30/0601* (2023.01)

(52) U.S. Cl.
CPC ....... *G06Q 10/025* (2013.01); *G06Q 30/0284* (2013.01); *G06Q 30/0641* (2013.01)

(58) Field of Classification Search
CPC . G06Q 10/02; G06Q 30/0284; G06Q 30/0641
See application file for complete search history.

(56) References Cited

U.S. PATENT DOCUMENTS

| | | | |
|---|---|---|---|
| 6,801,226 B1* | 10/2004 | Daughtrey | G06Q 10/02 345/157 |
| 2008/0091482 A1* | 4/2008 | Whitsett | G06Q 10/02 705/6 |
| 2018/0204467 A1* | 7/2018 | Crump | G06Q 30/0283 |
| 2019/0342410 A1* | 11/2019 | Petrossov | H04L 67/01 |

* cited by examiner

*Primary Examiner* — George Chen
*Assistant Examiner* — Duane N. Moore
(74) *Attorney, Agent, or Firm* — Fish & Richardson P.C.

(57) ABSTRACT

This document describes techniques and user interfaces for the creation of private jet segments. In one aspect, a method includes receiving a departure geographic identifier and a destination geographic identifier. A user interface is updated to present a first departure airport identifier for a first candidate departure airport, a first destination airport identifier for a first candidate destination airport, and one or more airport selection controls including, for each of one or more additional candidate airports, an airport selection control for selecting a corresponding additional candidate airport for the client-initiated segment. Each airport selection control depicts (i) an airport identifier for the corresponding additional candidate airport and (ii) an additional required amount that is required to be submitted by a creator of the client-initiated segment if the corresponding additional candidate airport is selected for the client-initiated segment using the airport selection control.

17 Claims, 12 Drawing Sheets

260 iPad 📶  8:11 AM   📶 🔋 47%
< Citation X

| XO PROGRAM FLEET | INSTANT BOOKING |

Citation X  8 seats
Super midsize jet  ✈ $14,900

Itinerary
02 Sept 2020  03 Sep 2020
11:15 PM  EFT 2h 27m  01:42 AM

KPBI ———✈——— KHPN

Palm Beach Intl  Westchester County
West Palm Beach  White Plains

Airports

253
Departure  Arrival
Show on the map  Show on the map

| KFLL  -$360 | KFEB  -$55 |
| KBCT  -$325 | KHPN |
| KMIA  -$250 | |
| KOPF  -$5 | |
| KPBI | |

$23,315
Price breakdown

[ Next ]

FIG. 2F

EFFICIENT PARAMETER SELECTION FOR CLIENT-CREATED PRIVATE JET SEGMENTS

CROSS REFERENCE TO RELATED APPLICATION

This application claims the benefit under 35 U.S.C. § 119(e) of U.S. Application Ser. No. 63/082,158, titled "USER INTERFACES FOR THE CREATION OF PRIVATE JET SEGMENTS," filed Sep. 23, 2020, the entire contents of which are incorporated herein by reference.

BACKGROUND

This specification relates to data processing and user interfaces.

Historically, automated systems for booking travel between an origin and a destination have been limited to (i) commercial public options in which individual spots (e.g., seats) are acquired by anyone and (ii) private options in which all spots in an aircraft or other mode of transport are acquired together by an individual. In both approaches, the users reserving such flights had very limited options, such as selecting an available seat on an existing flight or reserving a charter of an entire aircraft between two cities.

SUMMARY

In general, one innovative aspect of the subject matter described in this specification can be embodied in methods that include receiving a departure geographic identifier that identifies a departure geographic location from which the client-initiated segment will depart and a destination geographic identifier that identifies a destination geographic location at which the client-initiated segment will arrive; updating a user interface to present: a first departure airport identifier for a first candidate departure airport; a first destination airport identifier for a first candidate destination airport; and one or more airport selection controls including, for each of one or more additional candidate airports, an airport selection control for selecting a corresponding additional candidate airport for the client-initiated segment, wherein each airport selection control depicts (i) an airport identifier for the corresponding additional candidate airport and (ii) an additional required amount that is required to be submitted by a creator of the client-initiated segment if the corresponding additional candidate airport is selected for the client-initiated segment using the airport selection control; detecting user interaction with a given airport selection control; and in response to detecting the user interaction with the given airport selection control, assigning the corresponding candidate airport for the given airport selection control to the client-initiated segment. Other implementations of this aspect include corresponding apparatus, systems, and computer programs, configured to perform the aspects of the methods, encoded on computer storage devices.

These and other embodiments can each optionally include one or more of the following features. In some aspects, the one or more airport selection controls include a respective airport selection control for each of one or more additional candidate departure airports and a respective airport selection control for each of one or more additional candidate destination airports. The additional required amount for a respective airport selection control for an additional candidate departure airport can include a respective amount above a base required amount for the first candidate departure airport.

In some aspects, detecting the user interaction with the given airport selection control comprises detecting user interaction with the respective airport selection control for a given additional candidate departure airport. Aspects can include updating the user interface to present a first airport selection control for selecting the first candidate departure airport, the first airport selection control depicting the first departure airport identifier and a first additional selection requirement that is an amount below a sum of the base required amount and the additional required amount for the given additional candidate departure airport and an updated additional required amount for each other airport selection control for an additional departure airport control.

In some aspects, the additional required amount for a respective airport selection control for an additional candidate destination airport includes a respective amount above a base required amount for the first candidate destination airport. Detecting the user interaction with the given airport selection control can include detecting user interaction with the respective airport selection control for a given additional candidate destination airport. Aspects can include updating the user interface to present a first airport selection control for selecting the first candidate destination airport, the first airport selection control depicting the first destination airport identifier and a first additional required amount that is an amount below a sum of the base required amount and the additional required amount for the given additional candidate destination airport and an updated additional required amount for each other airport selection control for an additional candidate destination airport.

In some aspects, receiving the data indicating the departure geographic identifier and the destination geographic identifier can include presenting a first user interface enabling the creator of the client-initiated segment to select the departure geographic identifier and the destination geographic identifier and, in response to receiving the departure geographic identifier and the destination geographic identifier, presenting a second user interface enabling the creator to select a departure date for the client-initiated segment. The second user interface can include a calendar interface that presents a multiple dates and, for each date, a minimum base required amount for creating the client-initiated segment to depart from a departure airport to a destination airport on the date.

Some aspects include detecting user interaction with a given date in the calendar interface and, in response to detecting the user interaction with the given date in the calendar interface, presenting a third user interface for selecting a type of jet for the client-initiated segment, wherein the third user interface presents, for each type of jet, a base required amount for using the type of jet to travel from the departure airport to the destination airport on the given date. Updating a user interface can include updating the third user interface to present a customization interface that presents the first departure airport identifier, the first destination airport identifier, and the one or more airport selection controls.

Particular embodiments of the subject matter described in this specification can be implemented so as to realize one or more of the following advantages. User interfaces that enable clients to view multiple candidate airports and their relative required amounts (e.g., costs) on a single display, and enable the clients to select the airports for a new private jet segment, provide such information in a more efficient way, e.g., rather than requiring the client to go through the configuration process for each candidate airport to view its required amount. As such, the user interfaces discussed herein directly provide clients information about multiple candidate airports in both the departure and destination location without requiring the clients to navigate to multiple different user interface screens in order to obtain the information. This saves the client time, reduces the computational burden placed on the client device to generate and present many user interfaces, reduces the amount of data sent over a network between the client device and a server that provides the information for various flight options, and reduces the computational burden placed on the server to respond to the multiple requests for data. As such, the user interfaces discussed herein provide a more efficient workflow and presentation of information to the clients.

The user interfaces described herein also provide greater flexibility in finding an airport in particular cities, some of which the client may not be familiar. As private jets often depart from and arrive at smaller airports, the user interfaces provide information about airports of which clients are typically not aware. In addition, these smaller airports typically require lower amounts for use by private jet operators than large, commercial airports. By providing the relative required amounts for multiple candidate airports in a geographic area and enabling the client to select from the candidate airports, the user interfaces enable clients to discover better attributes for their private jet segments that may not otherwise be available.

A sequence of user interfaces described herein can guide a client through the selection of various attributes for a new private jet charter and present the relative required amounts for each attribute. This provides greater flexibility in configuring a private jet charter and more transparency in how the various attributes affect the overall required amount for the private jet charter. This can also provide a more efficient workflow and presentation of information to the clients by enabling the clients to make selections during the sequence based on their relative required amounts rather than viewing only the overall required amount at the end of the process and being required to try various attributes without relative required amount information until they find a suitable overall required amount for the private jet charter.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2I are illustrations of example interactive graphical interfaces for creating a new private jet charter segment.

Like reference numbers and designations in the various drawings indicate like elements.

DETAILED DESCRIPTION

Figure 1:
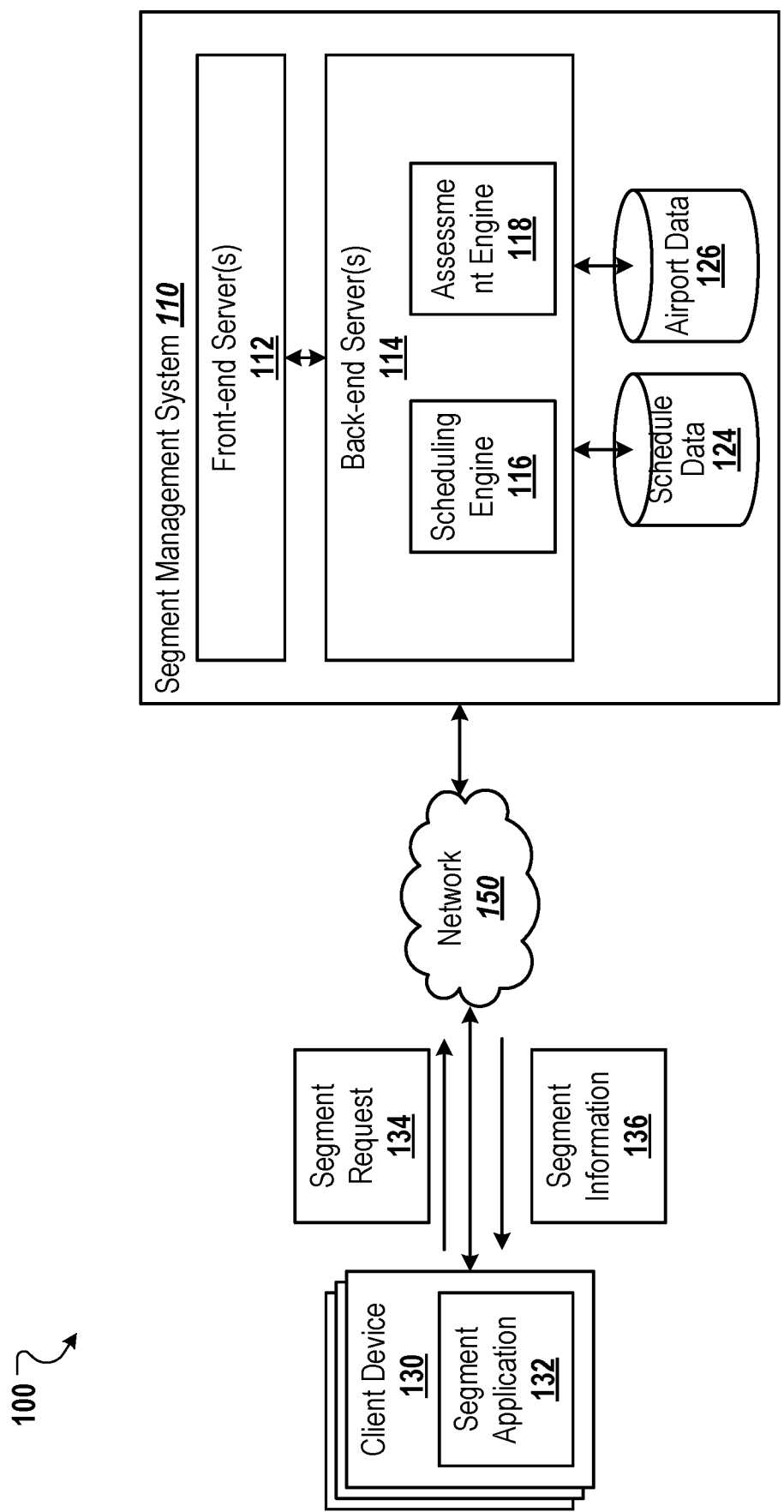
FIG. 1 is a block diagram of an example environment in which a segment management system enables clients to create private jet charter segments.

This document describes methods, systems, devices, and computer readable media that facilitate creation of client-initiated segments, including client-initiated private jet charter segments. As used throughout this document, a segment refers to a flight between an origin and a destination. The term segment refers to any type of flight that carries clients, including shuttles (e.g., a flight between a set of locations specified by the service provider) and charters (e.g., a flight between two locations freely specified by a client).

As described in detail below, the segment can be initiated by a client (e.g., a member of a service and/or a user of an application that facilitates creation of the segment), and made available to other clients, for example, by way of a native mobile application (or another appropriate interactive environment, such as a web interface). The aircraft used to travel between the origin and destination is typically a non-commercial aircraft (e.g., a private jet). While any appropriate type of aircraft (e.g., a propeller aircraft, a jet aircraft, or a rotorcraft) can be used, they will be collectively referred to using the term "jet" for brevity. A spot refers to seat or other appropriate area of occupancy for a client on a jet that is used for the segment.

As described in more detail below, the efficient creation of client-initiated segments involves a real-time interaction between the client that is initiating the segment and the automated computing system that is facilitating the creation of the client-initiated segment, which is also simply referred to herein as a segment for brevity. One aspect of this is providing user interfaces that enable the clients to configure the various customizable attributes for the segments, such as a departure airport, a destination airport, a departure date (which can include a date and/or time), at which the segment will depart from the departure airport, a type of jet (e.g., light, midsize, heavy, propeller, rotorcraft, etc.), a number of spots the client wants to claim on a shared segment (e.g., a shared charter segment in which at least one seat is made available to other clients), and/or other appropriate attributes.

The user interfaces are configured to make this process more efficient by guiding the user through the various candidate attributes and providing the relevant information (including relative required amounts) for each attribute in an efficient manner so that the client can quickly compare the required amounts for various different attributes without having to submit separate different requests for information or navigating to multiple different user interface displays to find such information for different attributes. The required amount for an attribute is an amount that the client will be required to submit (e.g., the price the client will pay) for inclusion of that attribute on the created segment. The overall required amount is the total amount that the client will be required to submit for the created segment, which takes into account the required amount for each attribute selected by the client.

FIG. 1 is a block diagram of an example environment 100 in which a segment management system 110 enables clients to initiate segments, including shared charter segments and non-shared (or private) charter segments. A shared charter segment is a charter segment for which the client that created the charter segment is making one or more spots on the charter segment available to other clients (e.g., for purchase) through a platform managed by the segment management system 110. A non-shared charter segment is a charter segment for which the client does not make any spots available for other clients.

The example environment 100 includes a network 150, such as a local area network (LAN), a wide area network (WAN), the Internet, a mobile network, or a combination thereof. The network 150 connects client devices 130 of clients with the segment management system 110. The example environment 100 may include many different client devices 130.

The segment management system 110, which can be operated and maintained by a segment service provider, allows users to arrange transportation on segments provided by the segment service provider. The segment service provider can provide scheduled segments between origins and destinations. The segment service provider can also allow clients (e.g., members of the segment service provided by the segment service provider) to initiate segments with custom attributes (e.g., custom departure date, origin and/or departure airport, destination and/or destination airport, time of day of departure, and/or type of jet). For example, a client may want to travel from an origin to a destination on a day in which the scheduled segment(s) from the origin to the destination are full or on a day that no segments are scheduled from the origin to the destination. In this example, the client can initiate a segment from the origin to the destination on the day and/or time that the client wants to travel. A client that initiates a segment is also referred to as a creator.

A client can initiate and manage segments, claim a spot on a segment, manage other travel arrangements with the segment management system 110, and/or perform other appropriate tasks related to the segment management system 110 using a client-side application 132 executed on the client's client device 130. The application 132 can transmit data to, and receive data from, the segment management system 110 over the network 150. The application 132 can be implemented as a native application developed for a particular platform or a particular device, web browser that provides a web interface, or another appropriate type of application.

The application 132 can present and detect user interactions with various graphical user interfaces that allow the client to create segments (e.g., create a new custom charter segment), manage segments (e.g., make a charter shared and make spots available to other clients), and/or claim a spot on shared segments. Some example interfaces generated and presented by the application 132 are illustrated in FIGS. 2A-2I and described in detail below.

The segment management system 110 includes one or more front-end servers 112 and one or more back-end servers 114. The front-end servers 112 can transmit data to, and receive data from, client devices 130 over the network 150. For example, the front-end servers 112 can provide, to the application 132 of a client's client device 130, interfaces or data for presentation with the interfaces. The front-end servers 112 can also receive data specifying user interactions with the interfaces of the application 130, such as attributes of a conditional segment initiated by the client. As described in more detail below, the front-end servers 112 can update the interfaces, provide new interfaces, and/or update the data presented by the interfaces based on user interactions with the application 132.

The front-end servers 112 can also communicate with the back-end servers 114. For example, the front-end servers 112 can identify data that is to be processed by the back-end servers 114, e.g., data specifying attributes of a conditional segment, and provide the identified data to the back-end servers 114. The front-end servers 112 can also receive, from the back-end servers 114, data for a particular client and transmit the data to the client device 130 of the particular client over the network 150.

The back-end servers 114 include a segment scheduling engine 116 and a spot assessment engine 118. The segment scheduling engine 116 manages the creation, confirmation, and/or cancellation of segments including charter segments. The segment scheduling engine 116 can receive data specifying attributes of a segment initiated by a client and create the segment within the segment management system 110. For example, a client that uses a client device 130 can interact with the application 132 to initiate a segment and specify attributes of the segment. The attributes can include a departure geographic identifier (e.g., an origin city and/or airport identifier, e.g., airport code), a destination geographic identifier (e.g., a destination city and/or airport identifier, e.g., airport code), a departure date (which can include a date and/or time) at which the segment will depart from the origin, a type of jet (e.g., light, midsize, heavy, propeller, rotorcraft, etc.), a number of spots the client wants to claim on the segment (e.g., if the segment is a shard charter segment), and/or other appropriate attributes. As used herein, the term engine refers to a data processing apparatus that performs a set of tasks.

The application 132 can generate a segment request 134 and cause the client device 130 to transmit the segment request 134 to the segment management system 110 over the network 150. The segment request 134 can include one or more of the client-specified attributes. In some implementations, the segment request 134 can include all of the attributes. For example, the application 132 can cause the client device 130 to transmit the segment request 134 after all of the appropriate attributes have been obtained from the client. As described in more detail below, the application 132 can prompt the client for the attributes using multiple interfaces.

In some implementations, the segment request 134 includes only a portion of the attributes (e.g., less than all of the attributes required by the segment service provider). For example, the segment scheduling engine 116 can cause the application 132 to prompt the client for additional attributes or other information based on initial attributes received in the conditional segment request 134. In a particular example, the segment request 134 can include the departure geographic identifier and destination geographic identifier. The segment scheduling engine 116 can receive these attributes and obtain information for potential segments along the route from the departure location identified by the departure geographic identifier to the destination location identified by the destination geographic identifier. The segment scheduling engine 116 can then provide, to the client device 110, segment information 136 that includes the obtained information.

This segment information 136 can include airports for the departure and destination locations. For example, the segment information 136 can include data identifying a set of one or more departure airports in or near the departure location and a set of one or more destination airports in or near the destination location.

The segment information 136 can also include, for each of one or more potential dates for the segment, the types of jets available on the date, a required amount (or range of amounts) for each available type of jet on the date, a required amount for each airport for the date, the required amount for one or more departure time ranges on the date (e.g., departing early or late in the day can be more expensive than mid-day), and/or required amounts for other customizable attributes. As described in more detail below, an assessment engine 118 can determine the required amounts that are provided.

Advantageously, the segment scheduling engine 116 can obtain information for multiple airports and multiple dates (e.g., for each day of multiple weeks or multiple months) and provide the information in response to the one request, e.g., in one data transmission or a sequence of transmissions within a short time period such as one or two seconds. The segment application 132 can cache the segment information 136 at the client device 110 so that the segment application 132 can more efficiently and more quickly update the user interfaces based on the user's selections without having to transmit subsequent requests over the network 150. This improves the user experience, reduces latency, prevents application errors that may occur while waiting to receive data, reduces consumed network bandwidth that would be used by the multiple requests, and reduces the computation burden that would be placed on the segment management system 110 to receive and respond to the requests.

The segment application 132 can receive the segment information 136 and present the information to the client using one or more user interfaces. In a particular example, as described below with reference to FIGS. 2A-2I, the segment application 132 can present a sequence of user interfaces that enable the client to select attributes to customize the segment. The client can use the user interfaces to select attributes for the segment and finalize the segment, e.g., by selecting a confirmation user interface element or purchasing the segment. In response, the segment application 132 can provide the attributes to the segment scheduling engine 116, e.g., via a second segment request.

The segment scheduling engine 116 can receive the data and create the appropriate segment within the segment management system 110 based on the data and the attributes received from the client device 130. The segment scheduling engine 116 can also store the data for the created segment in a schedule data storage unit 124. The schedule data storage unit 124 can include one or more databases (or other appropriate data storage structures) stored in one or more non-transitory data storage media (e.g., hard drive(s), flash memory, etc.).

The segment data storage unit 124 can store data for each segment that is provided by the segment service provider. For example, the segment data storage unit 124 can store data for each client-initiated segment. The data for each segment can include the departure geographic identifier for the segment, the destination geographic identifier for the segment, the departure date for the segment, the type of jet and/or an identifier of the actual jet being used for the segment, an identifier for each client that has claimed a spot on the segment (e.g., if the segment is a shared charter segment), and/or other appropriate segment data. The data for each segment can also include data specifying whether the segment is a shared or non-shared charter segment.

The segment scheduling engine 116 can notify other clients of the created segment, e.g., if the segment is a shared charter segment. In some implementations, clients can view the available spots on various segments from an origin to a destination. For example, the application 132 can present the required amounts for spots on segments from an origin to a destination using a calendar interface. A client, e.g., the client associated with (e.g., logged into the application 132 on) the client device 130, can request a spot on a shared charter segment using the application 132.

The segment management system 110 also includes an assessment engine 118. The assessment engine 118 can determine an amount that clients are required to submit to create a new client-initiated segment. The amount can be based on various factors, such as the type of jet, the departure and destination geographic identifiers, the departure date, the departure airport, the destination airport, the time of data of departure, the duration of time between the time the segment is initiated and the departure date, the type of segment (e.g., conditional or confirmed), and/or other appropriate factors.

The various options of each attribute can affect the overall required amount for a segment. For example, there may be multiple types of jets that can be used to travel along a particular route, including turbo-props, light, mid-size, super mid-size, and/or heavy. Each type can have a different required amount for a particular route that can be based on the amount to operate the type of jet on the route, the availability of the jet for that route (e.g., it may cost more to move a jet to the departure airport for the segment), and/or other appropriate factors.

Similarly, there are often multiple airports that can accommodate private jets in metropolitan areas. Each airport can require that a private jet operator provide some amount (e.g., a monetary fee) to depart from or land at the airport. These amounts can vary between the airports. For example, large commercial airports may require a much larger amount than small private airports used mostly by recreational pilots. The assessment engine 118 can maintain the required amounts for each airport in an airport data storage device 126.

The required amount for a segment can also vary based on the time of day of departure. For example, departures during business hours may have a smaller required amount than departures early morning or late at night.

When providing the segment information 136 to the segment application 132, the scheduling engine 116 can obtain the required amounts for the various options for each attribute and provide that data with the segment information 136. This enables the segment application 132 to present the relative amounts, e.g., the additional amount required for a premium option, in the user interfaces presented to the client when configuring a client-initiated segment. This also enables the segment application 132 to compute the overall required amount for the segment based on the attributes selected by the client.

FIGS. 2A-2I are illustrations of example interactive graphical interfaces for creating a new private jet charter segment. The segment application 132 can present the interfaces to a client in order to enable the client to configure a custom charter segment from an origin to a destination by interacting with the interfaces to select attributes for the charter segment. The interfaces can also allow the user to go backwards, e.g., to modify a previously selected attribute. The segment application 132 can generate and update the interfaces based on segment information 136 received from the segment management system 110.

The sequence of interfaces, which can be in different orders, provides transparency in the various factors that affect the overall required amount for a charter segment. At each step at which the client selects an attribute, the interfaces present the relative required amounts of the various options for the attribute. In this way, the client can make more informed decisions about the attributes and customize the charter segment in an efficient manner without having the recreate multiple charters to find one that provides the right balance between attributes and the required amount.

Figure 2A:
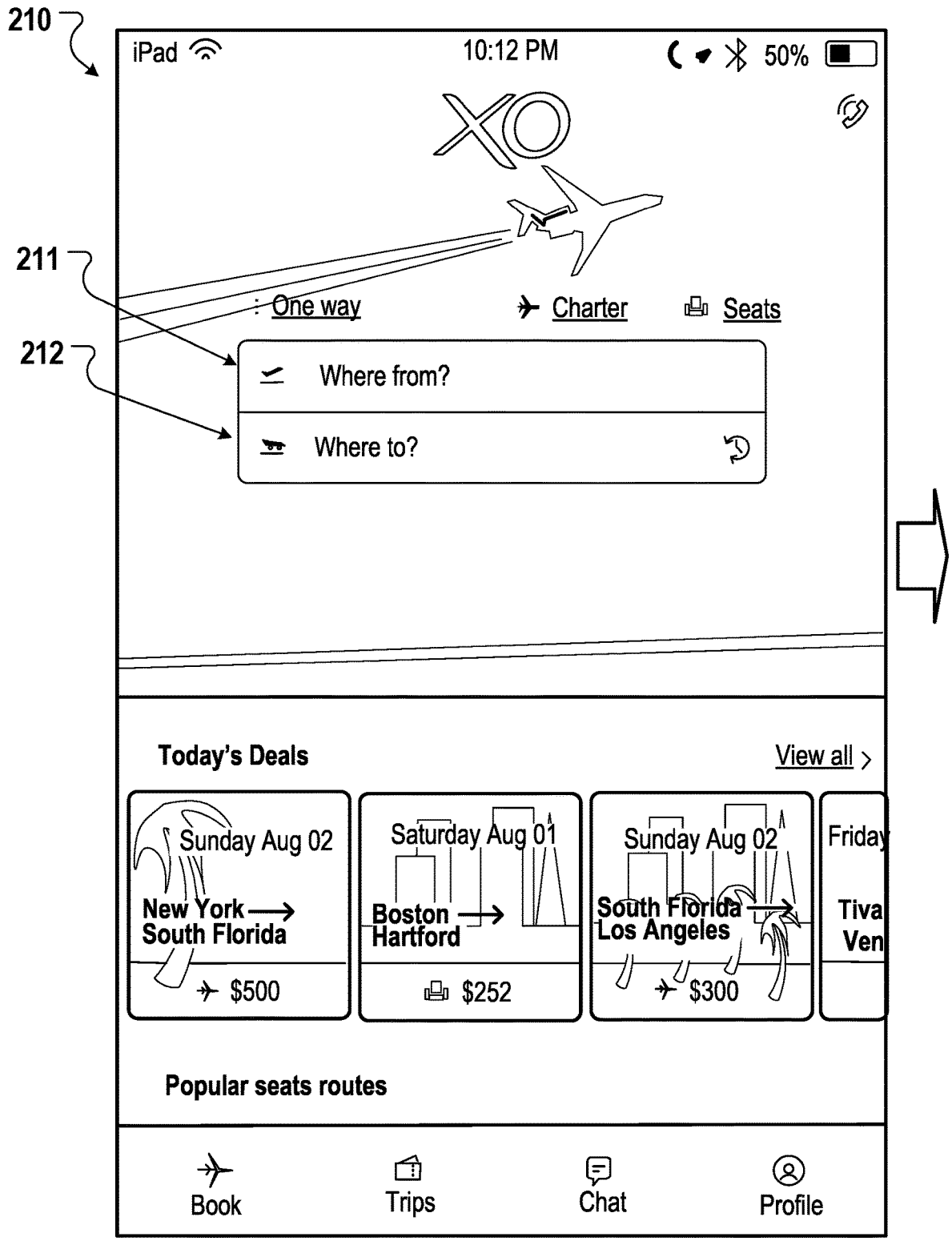

Referring the FIG. 2A, a route selection interface 210 enables the user to select the route for the segment. The route selection interface 210 includes a departure selection element 211 and a destination selection element 212. In some implementations, the client can enter, e.g., type, an airport or name of a geographic region (e.g., city) into the departure selection element 211 and the destination selection element 212. In some implementations, user interaction with, e.g., selection of, the departure selection element 211 or the destination selection element 212 causes the segment application 132 to present the airport selection interface 220 of FIG. 2B. After selecting an airport (or group of airports in a geographic region) using the interface 220 of FIG. 2B, the segment application 132 can return to the interface 210 so that the client can select the other airport (e.g., to select the destination airport after selecting the departure airport) or view the two airports.

Figure 2B:
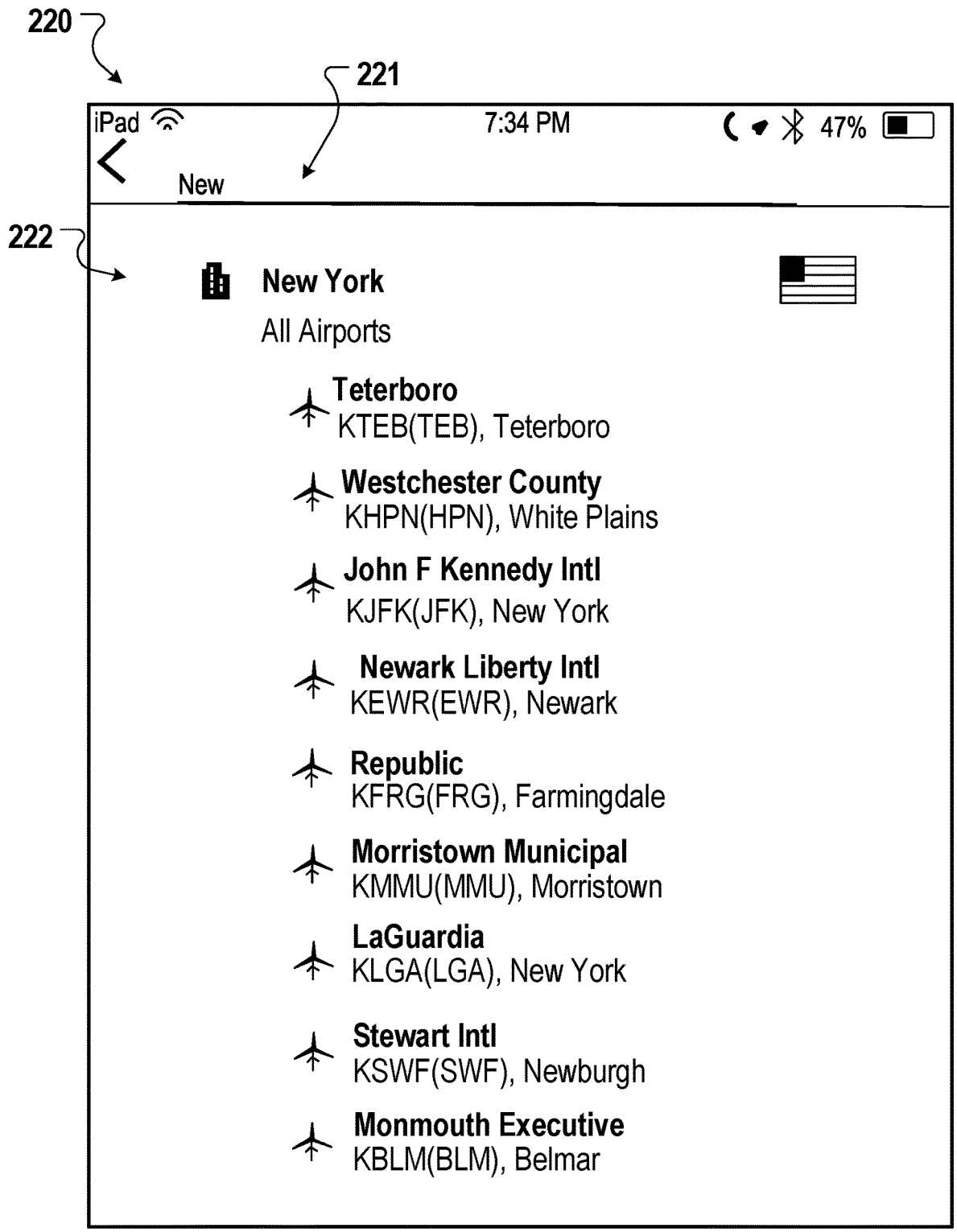

Referring to FIG. 2B, the example airport selection interface 220 includes a text entry field 222 in which a client can enter the name of a geographic region (e.g., city) or airport. The segment application 132 can include an autocomplete engine that predicts the geographic region or airport being entered based on the text that the client has entered and presents the predicted geographic region or airport in an airport selection list interface 221. In this example, the segment application 132 has predicted that the client is entering "New York" based on the partial text "New" in the text entry field 222.

The airport selection list interface 221 also includes, for each predicted geographic region, a list of one or more airports for that geographic region. In this example, the airport selection list interface 221 includes ten different airports for New York (of course there may be other quantities of airports for other cities or for New York). The client can select one of the airports from the airport selection list interface 221 or a group of (e.g., all) airports for the geographic region by selecting the geographic region instead. In response, the segment application 132 can assign that airport (or region) as the departure airport or destination airport based on which airport selection element 211 or 212 was interacted with in the interface 210. The segment application 132 can also return to the interface 210 and present the selected airport (or region) in the appropriate airport selection element 211 or 212. After selecting both the departure and destination airports or regions, the segment application 132 can transition to the date selection interface 230 illustrated in FIG. 2C.

Figure 2C:
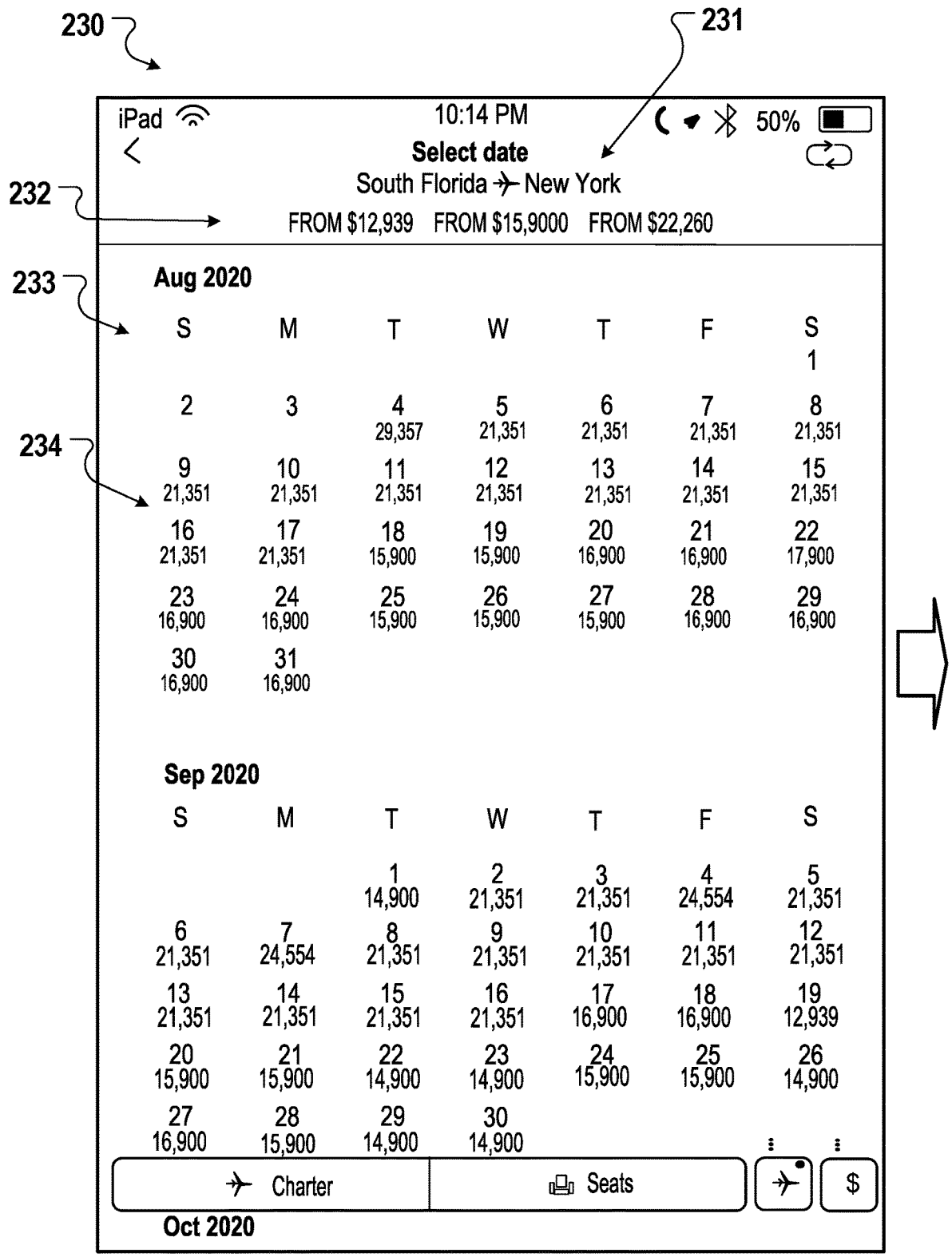

Referring to FIG. 2C, the date selection interface 230 includes a route indicator element 231 that presents the selected route (e.g., South Florida to New York). The date selection interface 230 also includes a calendar interface 233 that presents a calendar and, for each (or at least some) dates in the calendar, a required amount 234 to create a new charter segment that departs on that date and that travels the selected route. The required amount presented for each date can represent the minimum amount for a client-initiated segment (e.g., a charter segment) on that date, e.g., based on the attributes having the lowest required amounts.

In some implementations, the required amounts have different visual characteristics based on the magnitudes of the required amounts. For example, a first color can represent a first required amount range, a second color can represent a second required amount range, and a third color can represent a third required amount range. Of course, more or fewer ranges and/or different visual characteristics can be used. The date selection interface 230 includes a legend 232 that indicates the ranges for each visual characteristic. By presenting the required amounts using the calendar interface and using the different visual characteristics, a client can quickly view the relative amounts between various days without navigating to multiple interfaces to view the amount for each day. If the client's travel dates are flexible, the client can quickly find the best date for the charter segment, e.g., by scanning for dates having required amounts in a particular color.

In some implementations, the required amounts presented are based on a particular type of private jet. For example, the required amounts can be based on a type that is available for that route and that has the lowest required amount among the available types. In another example, the required amounts can be based on a type of private jet selected by the client, e.g., using an interface presented between the interface 220 and the interface 230.

Figure 2D:
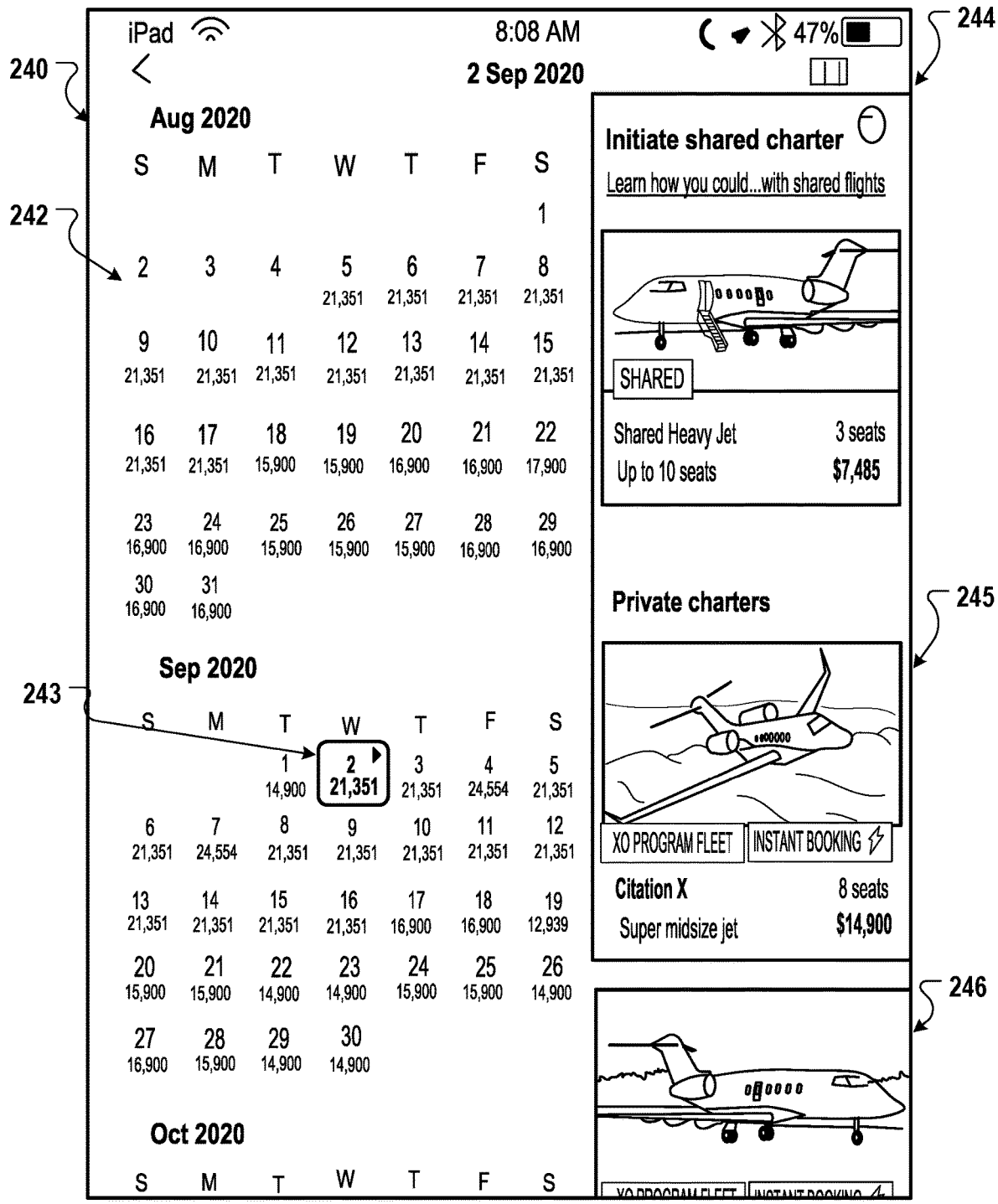
Figure 2E:
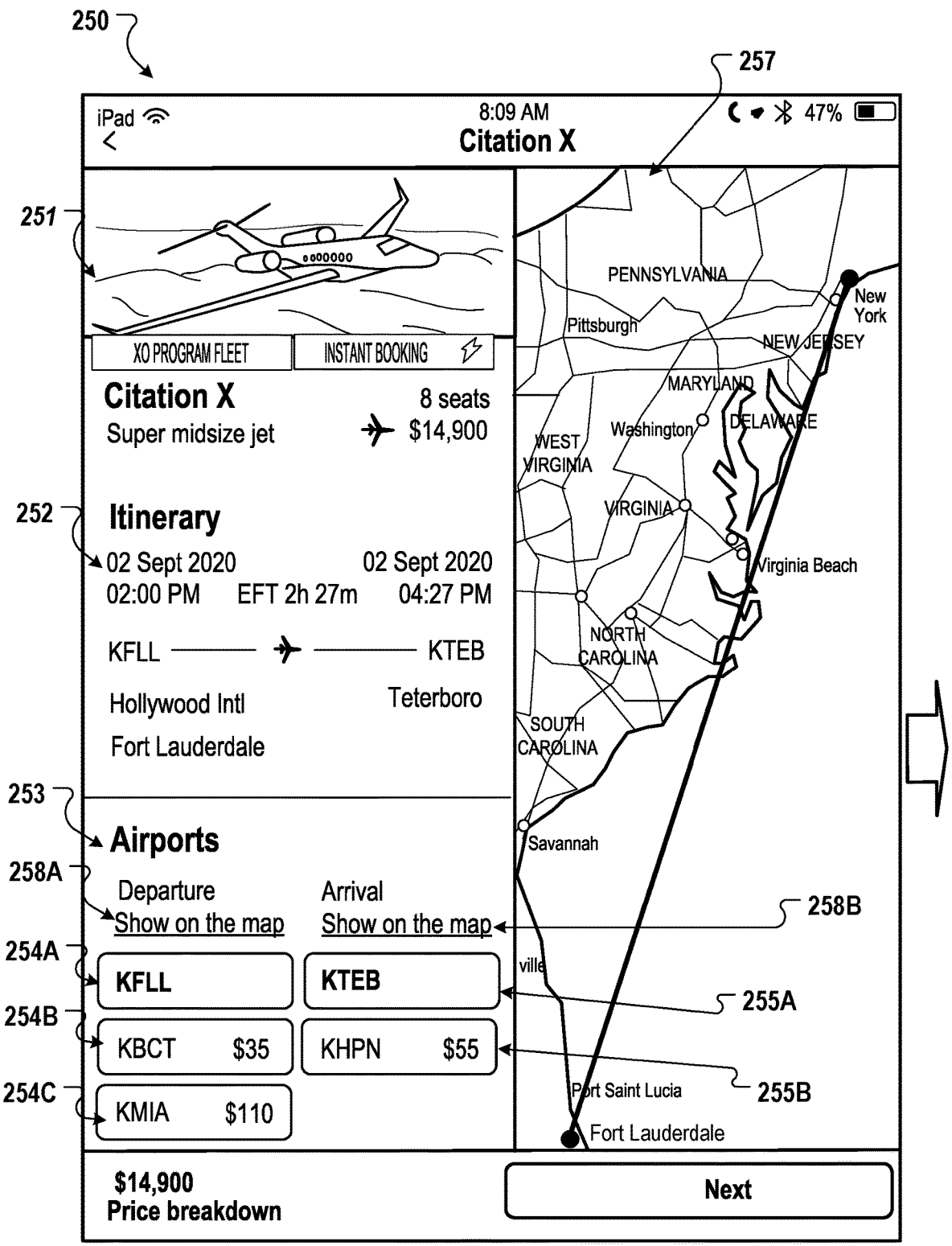

The client can select a date by interacting with the date in the calendar interface 233. In response to detecting that a date has been selected, the segment application 132 can present the jet selection interface 240 of FIG. 2D. Referring to FIG. 2D, the jet selection interface 240 includes a calendar interface 242 similar to the calendar interface 233. The calendar interface 242 highlights the selected date, e.g., using a different color background 243 for the selected date. In this example, the client selected September 2 for the departure date using the calendar interface 233.

The jet selection interface 240 includes, for multiple types of jets, a respective jet card 244-246 that includes information about the type of jet and its required amount. The jet card 244 is for a shared charter using a heavy jet and has a required amount of $7485 for each spot on the jet. Since this is a shared charter, other clients can also claim a spot on the charter. The jet card 245 is for a super midsize jet and has a required amount of $14,900 for the entire jet. Additional jet cards, including the rest of the jet card 246, can be presented if the client scrolls down in the jet selection interface 240. By presenting the information about each available jet for the segment and their corresponding information including the required amounts, the user can efficiently compare the jets and their relative required amounts.

The client can select a jet by interacting with, e.g., selecting, the jet card for the jet. In response to detecting user interaction with a jet card, the segment application 132 can present a segment customization interface 250 that enables the client to customize at least some of the attributes of the client-initiated segment from a single interface.

The segment customization interface 250 includes a jet information element 251 that includes information about the selected type of jet and an itinerary element 252 that includes the scheduled departure and arrival time of the client-initiated segment and the route between the currently selected airports. The itinerary can default to a departure time of 2:00 PM, which can be adjusted as described below. The charter customization interface 250 also includes a map 257 that presents the route.

The segment customization interface 250 includes an airport adjustment interface 253 that enables the client to view the relative required amounts of airports in the departure and destination geographic regions and change the airports for the client-initiated segment. The airport adjustment interface 253 includes a first departure airport element 254 that includes an airport identifier (e.g., airport code) for a first candidate departure airport, which is KFLL in this example. The airport adjustment interface 253 includes a first destination airport element 255A that includes an airport identifier (e.g., airport code) for a first candidate destination airport, which is KTEB in this example.

The first candidate departure airport and the first candidate destination airport can be default airports selected by the segment application 132 or the segment scheduling management system 110 based on the route. In some implementations, the first candidate departure airport is the departure airport having the lowest required amount for departing the client-initiated segment among a group of candidate departure airports in or near the departure location. In this example, KFLL has a lower required amount than KBCT and KMIA. Similarly, the first candidate destination airport is the destination airport having the lowest required amount for the client-initiated segment to arrive among a group of candidate departure airports in or near the destination location. In this example, KTEB has a lower required amount than KHPN.

The airport adjustment interface 253 also includes airport selection controls 254B, 254C, and 255B for each other candidate airport for the client-initiated segment. In particular, the airport selection control 254B enables the client to select KBCT as the departure airport instead of KFLL, e.g., by selecting or otherwise interacting with the airport selection control 254B. Similarly, the airport selection control 254C enables the client to select KMIA as the departure airport and the airport selection control 255B enables the client to select KHPN as the destination airport instead of KTEB.

Each airport selection control 254B, 254C, and 255B depicts the airport identifier for its corresponding airport and an additional required amount for selecting the corresponding airport instead of the currently selected airport. For example, if the client selects KBCT as the departure airport instead of KFLL, the client would be required to submit an additional $35 over the required amount for the client-initiated segment if KFLL was the departure airport. Similarly, if the client selects KHPN as the destination airport instead of KTEB, the client would be required to submit an additional $55 over the required amount for the client-initiated segment if KTEB was the destination airport.

The additional required amounts depicted by each airport selection control 254B, 254C, and 254D represent the relative amounts between the corresponding airports and the currently selected airports. As shown in FIG. 2F and described below, the segment application 132 can update the airport adjustment interface 253 to present additional required amounts for non-selected airports that are relative to the currently selected airports. By presenting the relative amounts for the airports in this way, the required amounts of the airports are more transparent and the client can more efficiently select from among multiple airports for each geographic area without having to navigate to multiple interfaces to find the relevant information or reconfigure multiple custom segments to arrive at a desired overall required amount.

To highlight the currently selected airports, the backgrounds of the elements 254A and 255A for the selected airports can be a different color than the airport selection controls 254B, 254C, and 255B. Other appropriate visual characteristics can also be used.

The client can change departure and/or destination airports by selecting the selectable element for one of the airports. For example, if the client would prefer to depart from KMIA and the additional $110 is acceptable, the client can select the airport selection control 255B to select KMIA as the departure airport. In this way, the client can more efficiently select from among candidate airports with cost information for the multiple airports presented on a single display. By presenting the airports for each geographic region in this way, the client may learn of nearby airports and potentially find one that is more convenient and/or has a lower required amount than ones that the client knows about and would typically select. As shown in FIG. 2F, and described below, the segment application 132 can update the required amounts for the airports based on the newly selected airports.

Figure 2G:
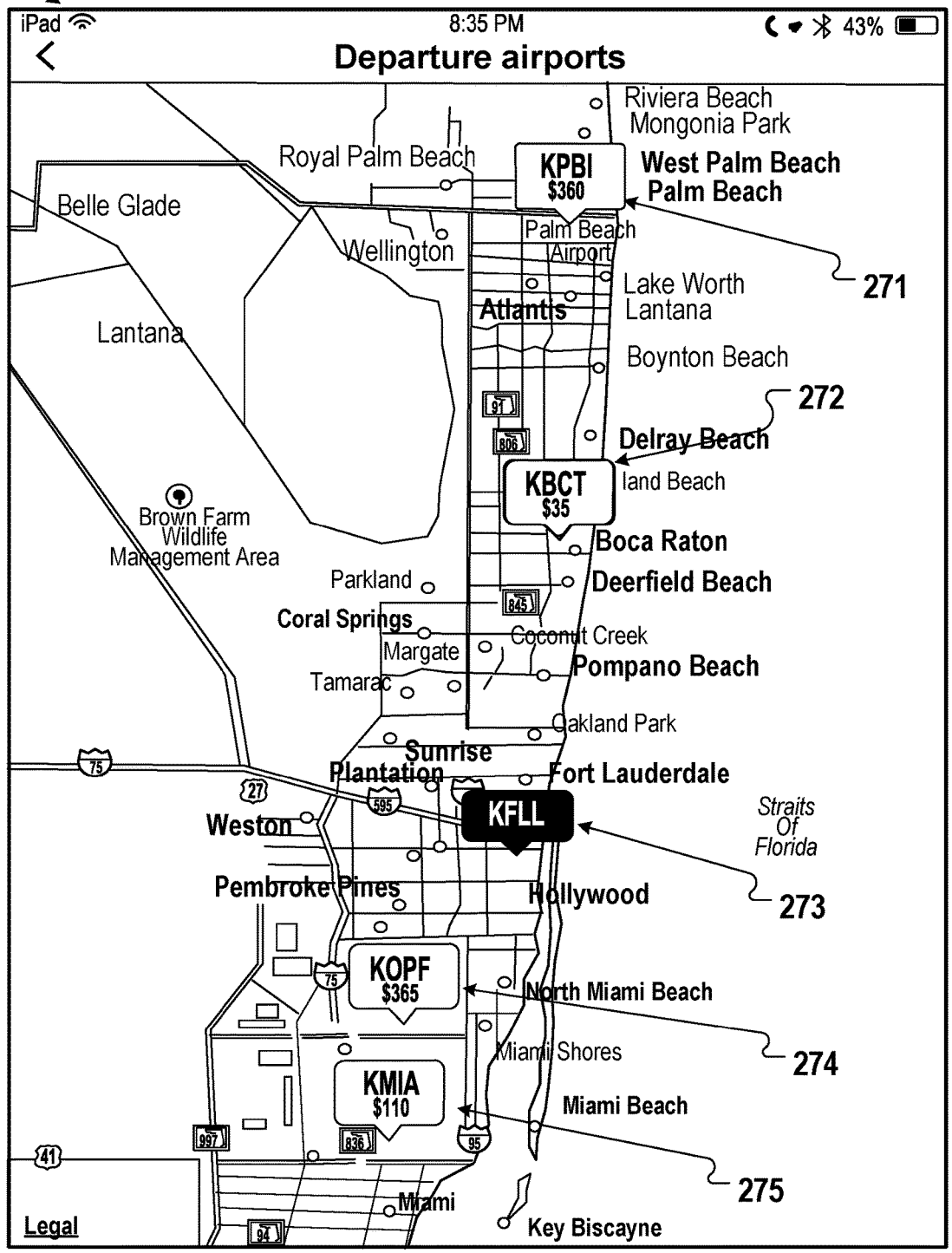

The segment customization interface 250 also includes a link 258A to view the candidate departure airports on a map interface and a link 258B to view the candidate destination airports on a map interface. The map interface presents the candidate airports on a map so that the client can view their relative locations and select the airports based on location. An example map interface is illustrated in FIG. 2G and described below.

Referring to FIG. 2F, an updated segment customization interface 260 includes an updated airport adjustment interface 253 based on the client selecting different airports. In particular, the client has selected KPBI as the departure airport and KHPN as the destination airport. In response, the segment application 132 has updated the airport adjustment interface 253 to present a departure airport element for the currently selected departure airport KPBI and a destination airport element for the currently selected destination airport KHPN, e.g., instead of airport selection controls for these airports.

In addition, the segment application 132 has updated the airport adjustment interface 253 to present a departure airport control 261 for reselecting KFLL as the departure airport and a destination airport control 262 for reselecting KTEB as the destination airport. In addition, the segment application has determined additional required amounts for each non-selected candidate airport relative to the selected candidate airports and presented the additional required amounts in the airport selection controls. For example, the segment application 132 has determined that the required amount for departing from KFLL is $360 less than departing from KPBI and presented the additional required amount of −$360 in the airport selection control 261. Similarly, the segment application 132 has determined that the required amount for arriving at KTEB is $55 less than arriving at KHPN and presented the additional required amount of −$55 in the airport selection control.

The segment application 132 can determine these amounts by comparing the total required amount required by each airport. For example, if the KPBI requires $500 and KFLL requires $140, the difference is $360 as depicted by the airport selection control 261. The segment management system 110 can provides these airport required amounts as part of the segment information 136.

Enabling the selections of various airports and updating the relative amounts in real-time based on the selections provides an efficient mechanism for clients to explore the different airport options and compare required amounts for each combination of options.

Referring to FIG. 2G, an example map interface 270 shows a map of the departure geographic region and, for each airport in the geographic region, an airport element 271-275. The airport elements 271-275 indicate the geographic location of the airports on the map and present a relative required amount (e.g., the additional required amount) for using the airport as the departure airport relative to a required amount for a currently selected departure airport. In this example, the currently selected departure airport is KFLL as indicated by the different color airport element 273, which is different from the other airport elements. For example, the airport element 275 indicates that using airport KMIA as the departure airport would result in a $110 increase over the required amount for KFLL.

The client can select a different departure airport directly from the map interface 270. For example, if the client interacts with the airport element 275, the segment application 132 can assign KMIA as the departure airport and update the overall required amount for the charter segment, e.g., by increasing the overall required amount by $110. The segment application 132 can also update the relative required amounts presented by the airport elements to present the relative amounts with respect to the required amount for KMIA rather than KFLL.

Referring back to FIG. 2F, the user can scroll down from the airport adjustment interface 253 to view additional customizable attributes for the new client-initiated charter segment. One additional customizable attribute is the time of day of departure, which can be selected by the client.

Figure 2H:
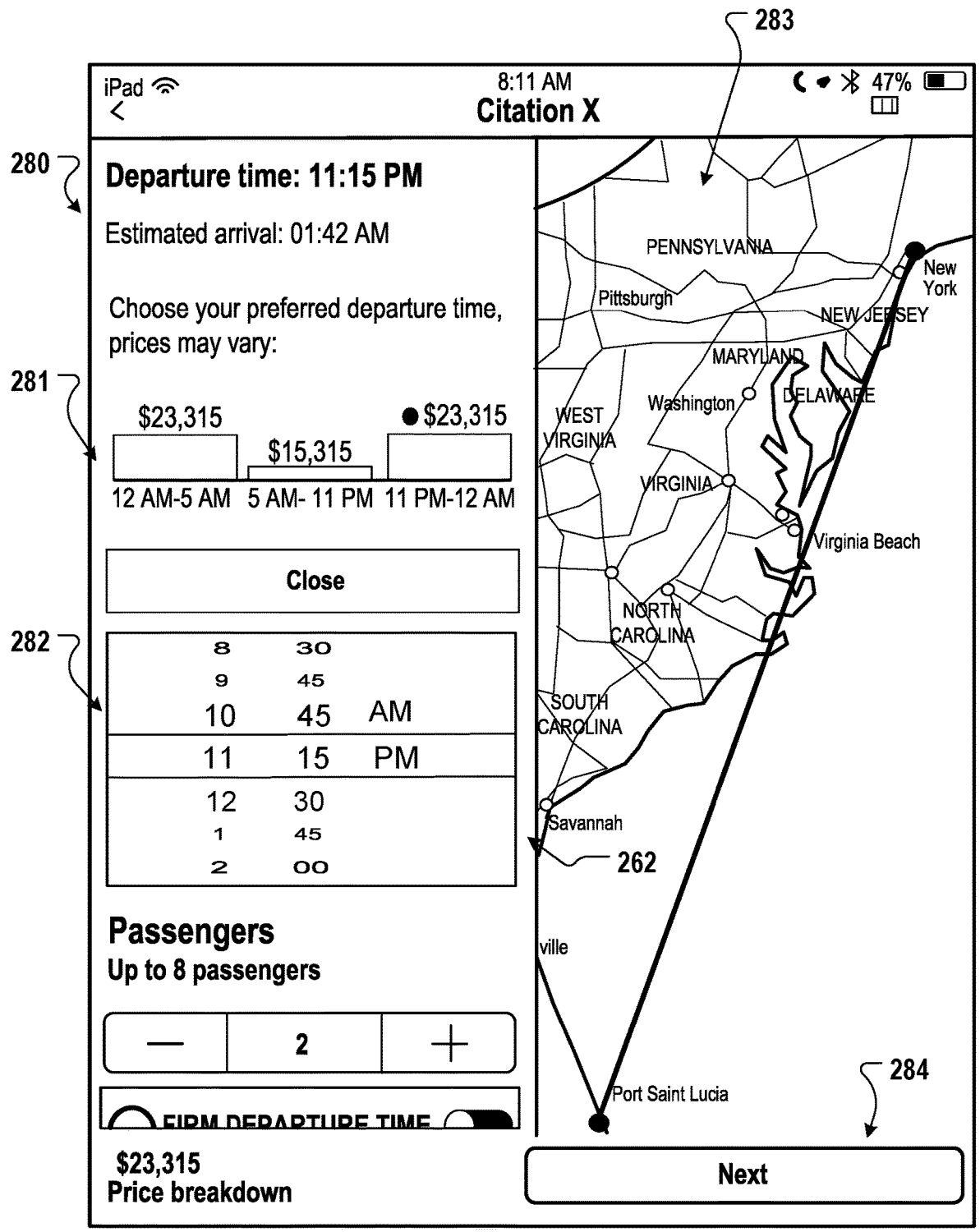

Referring to FIG. 2H, when the user scrolls down from the airport adjustment interface 253, the segment application 132 can present a time adjustment interface 282 in the user interface 280. The time adjustment interface 282 enables the client to select a departure time. In this example, the client has selected a departure time of 11:15 pm.

The user interface 280 also includes a required amounts element 281 that includes, for each of several time ranges, a required amount for the charter segment if the charter segment is scheduled to depart within that time range. In this example, if the segment is scheduled to depart between 12 AM and 5 AM, the required amount is $23,315. This combination of the time adjustment interface 282 and the required amounts element provides transparency into the relative required amounts for the various departure time options and enables the client to view such information without having to navigate to multiple interfaces, experiment with different time options, and/or reconfigure the charter segment with different options until arriving at a desired overall required amount range.

The segment data 136 received from the segment management system 110 can include, for example, information indicating the time periods and, for each time period, any additional required amount for that time period. The required amounts for time periods can be based on other attributes. For example, the departing from or arriving at a particular airport during early time periods (e.g., between 12 AM and 5 AM) may have a higher additional required amount than at other airports. Similarly, departing a heavy jet may have a higher additional required amount for the early time period than departing a light jet.

The segment application 136 can access the received segment information 136 to determine the overall required amount for each time period, e.g., based on the attributes selected by the user, and present the overall required amount for each time period in the required amounts element 281.

After the client has selected the airports and the departure time for the segment, the client can select a next button 284. In response, the segment application 132 can navigate to the checkout interface 290 illustrated in FIG. 2I. The checkout interface 290 includes a breakdown of the overall required amount 293. The checkout interface 290 includes a base required amount 291 for the charter segment and an additional required amount for each upgraded attribute (e.g., more expensive airport and/or time range). The base required amount 291 can be based on the route, the selected date, and the type of jet. In this example, the client upgraded the airport and selected an early departure time period, resulting in an additional required amount 292. In some implementations, the checkout interface can present the additional required amount for each attribute separately, e.g., the additional required amount for each selected airport and/or the additional required amount for the selected time of day of departure. The checkout interface can also include a user interface element (e.g., button) that enables the client to confirm the new segment.

Figure 3:
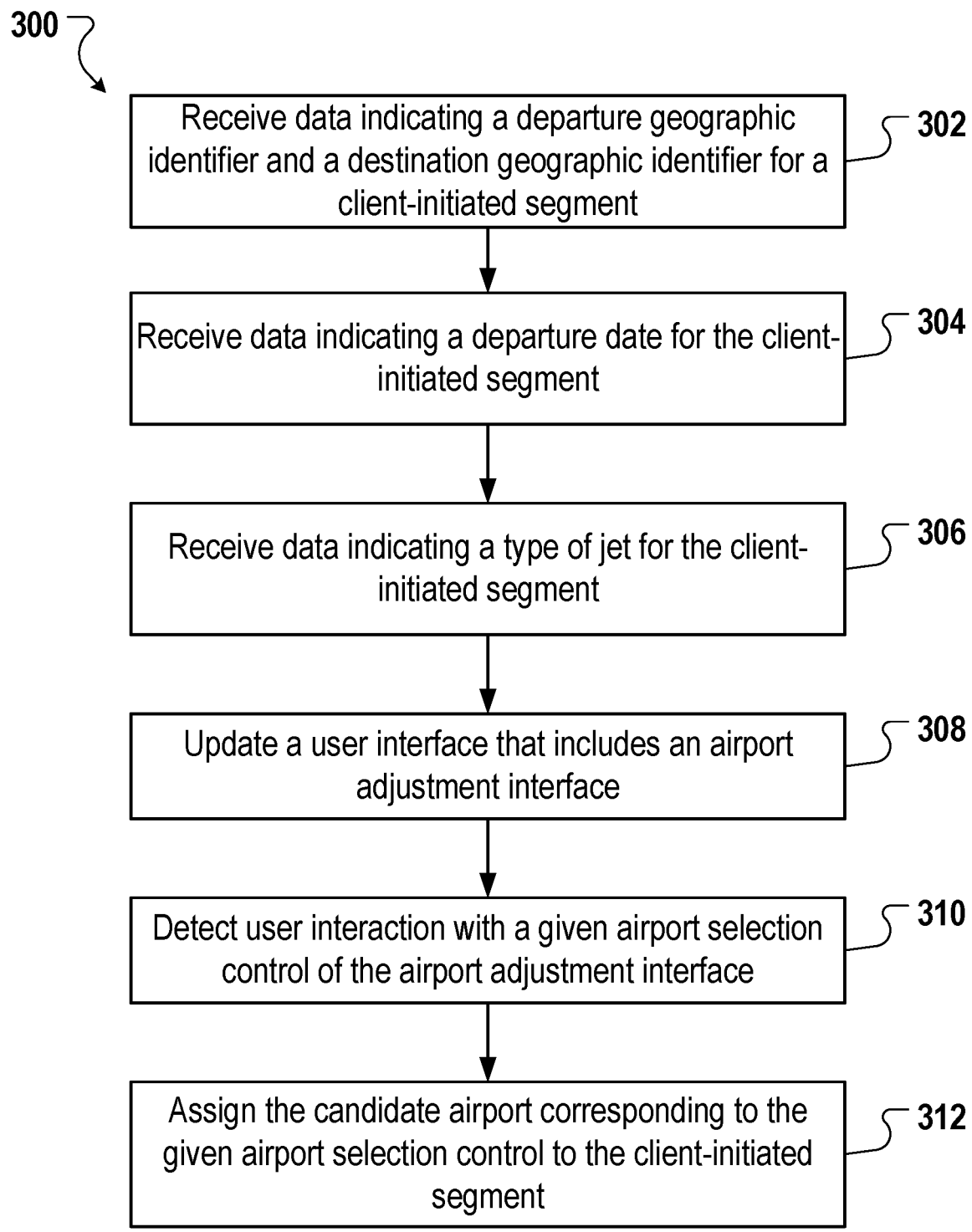
FIG. 3 is a flow chart of an example process for creating a new private jet charter segment.

FIG. 3 is a flow chart of an example process 300 for creating a new private jet charter segment. Operations of the process 300 can be implemented by one or more servers (or other computing devices), such as the client device 110 and/or the segment management system 110 of FIG. 1. Operations of the process 300 can also be implemented as instructions stored on a computer readable medium, e.g., non-transitory computer readable medium, where execution of the instructions by one or more servers (or other computing devices or data processing apparatus) cause the one or more servers to perform operations of the process 300.

Data indicating a departure geographic identifier and a destination geographic identifier for a client-initiated segment is received (302). For example, the segment application 132 can present the user interface 210 and the client creating the client-initiated segment can select the geographic identifiers using the departure selection element 211, the destination selection element 212, and optionally the user interface 220 of FIG. 2B, as described above. The departure geographic identifier identifies a departure location from which the client-initiated segment will depart and the destination geographic identifier identifies a destination geographic location at which the client-initiated segment will arrive.

In some implementations, the segment application 132 can receive the data and transmit the data to the segment management system 110. In response, the segment management system 110 can transmit, to the segment application, segment information that includes information for potential segments along the route from the departure location identified by the departure geographic identifier to the destination location identified by the destination geographic identifier. As described above, the segment information can include airports for the departure and destination locations. The segment information can also include, for each of one or more potential dates for the segment, the types of jets available on the date, a required amount (or range of amounts) for each available type of jet on the date, a required amount for each airport for the date, the required amount for one or more departure time ranges on the date (e.g., departing early or late in the day can be more expensive than mid-day), and/or required amounts for other customizable attributes.

Data indicating a departure date for the client-initiated segment is received (304). For example, the segment application 132 can update the user interface to present a date selection interface, such as the date selection interface 230 of FIG. 2C, in response to receiving the data indicating the departure geographic identifier and the destination geographic identifier for a client-initiated segment. The client can select a departure date using the date selection interface.

Data indicating a type of jet is received (306). For example, the segment application 132 can update the user interface to present a jet selection interface, such as the jet selection interface 240 of FIG. 2D, in response to receiving the data indicating the departure date for the client-initiated segment. The client can select the type of jet using the jet selection interface.

The user interface is updated to present an airport adjustment interface (308). For example, the segment application 132 can update the user interface to present the airport adjustment interface, which can be the same as or similar to the airport adjustment interface 253 of the segment customization interface 250. That is, the segment application can present the segment customization interface 250 that includes the airport adjustment interface 253.

As described above, the airport adjustment interface 253 includes a first departure airport identifier for a first candidate departure airport, a first destination airport identifier for a first candidate destination airport, and one or more airport selection controls for additional candidate airports that can be selected for the client-initiated segment by the client. The first candidate departure airport and the first candidate destination airport can be default airports based on the received geographic identifiers.

Each airport control can enable the user to select a corresponding candidate airport. The airport selection control for a candidate airport can depict an airport identifier for the corresponding candidate airport and an additional required amount that is required to be submitted by the client if the corresponding additional candidate airport is selected for the client-initiated segment using the airport selection control. For example, if the client would be required to change the departure airport from the first candidate departure airport to a second candidate departure airport is $20, the airport selection control for selecting the second candidate departure airport can depict $20.

User interaction with a given airport selection control is detected (310). For example, the client can interact with, e.g., select, the given airport selection control. The segment application 132 can detect the interaction.

The candidate airport corresponding to the given airport selection control is assigned to the client-initiated segment (312). The segment application 132 can update the attributes for the client-initiated segment based on the selection. For example, if the client selects the second candidate departure airport, the segment application 132 can update the attributes for the client-initiated segment to indicate that the departure airport for the client-initiated segment is the second candidate departure airport.

The segment application 132 can also update the overall required amount for the client-initiated segment based on the additional required amount for the selected airport, e.g., by adding the additional required amount to a base required amount for the client-initiated segment. The base required amount can be the overall required amount for the client-initiated segment if the first candidate departure airport and the first candidate destination airport are used for the segment. The segment application 132 can also update the user interface to present the updated overall required amount.

As described above with reference to FIGS. 2E and 2F, the segment application 132 can also update the airport adjustment interface to present updated additional required amounts for non-selected candidate airports. These updates additional required amounts can be relative to the currently selected airport. For example, if the client selected a different destination airport, the segment application 132 can update the additional required amount for a non-selected candidate destination airport to a difference between the required amount for the selected destination airport and the non-selected destination airport. The segment application 132 can perform this update each time the client selects a different airport.

Figure 2I:
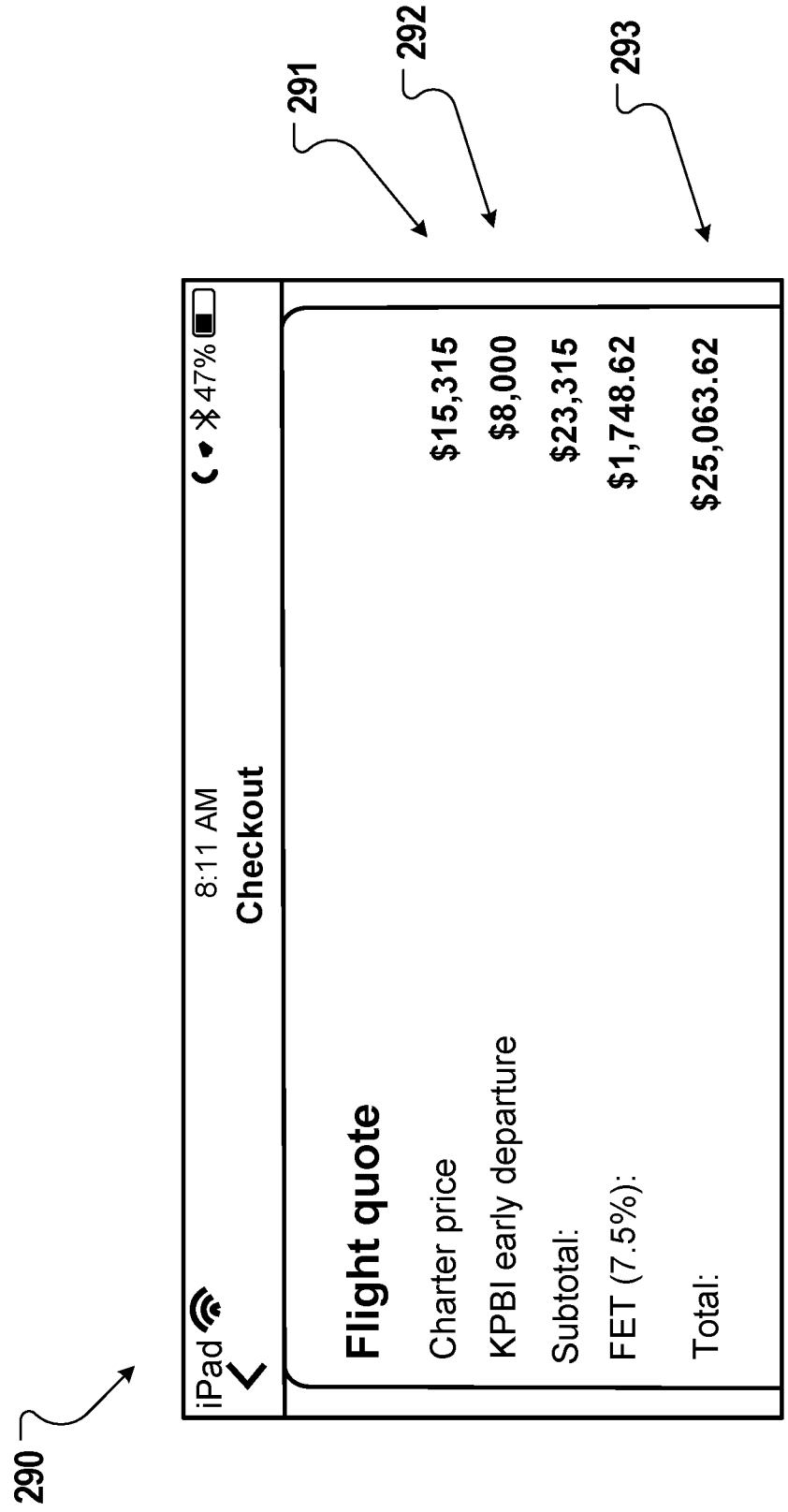

After the client has selected the attributes for the client-initiated segment, the client can view a breakdown of the required amounts on a checkout interface, e.g., the checkout interface 290 of FIG. 2I. The client can then confirm the segment. In response, the segment application 132 can provide data specifying the attributes of the client-initiated segment to the segment management system 110. The segment management system 110 can schedule the segment in the system.

Figure 4:
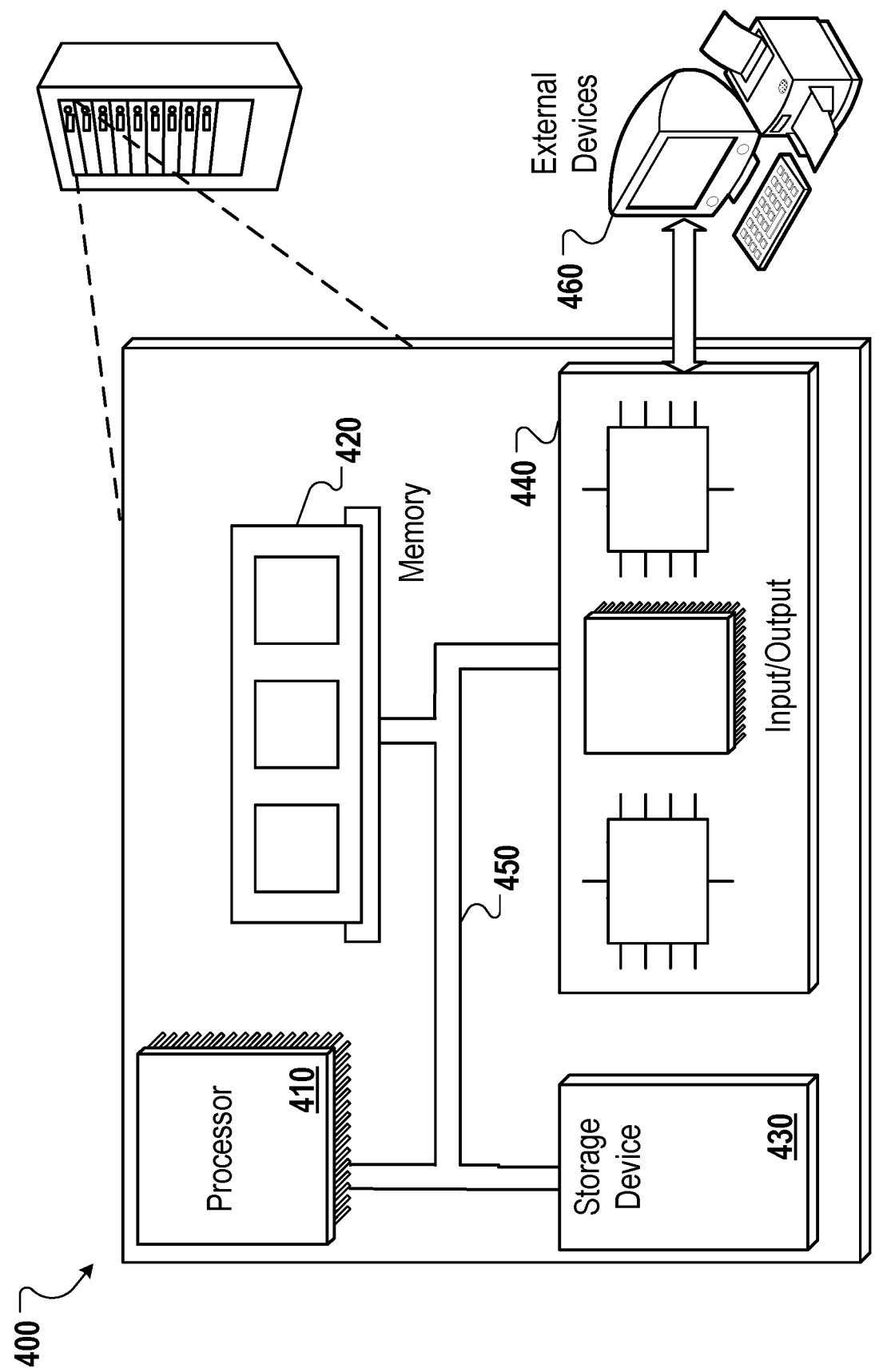
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of providing a user interface for enabling client-initiated segment creation, comprising:

receiving, via the user interface displayed at a client device of a user, selection data indicating a user selection to view departure airports and destination airports for a new client-initiated segment, wherein the selection data comprises a departure geographic identifier that identifies a departure geographic location from which the client-initiated segment will depart and a destination geographic identifier that identifies a destination geographic location at which the client-initiated segment will arrive;

identifying a set of candidate departure airports and a set of candidate destination airports based on a set of criteria comprising (i) respective required amounts for each candidate departure airport and each candidate destination airport and (ii) location information for each candidate departure airport and each candidate destination airport;

generating, by one or more processors, airport selection controls for the candidate departure airports and the candidate destination airports, the airport selection control for each candidate airport being a user interface control that enables a user to select a candidate airport for the client-initiated segment, the airport selection controls comprising:

a first candidate departure airport control that depicts a first departure airport identifier for a first candidate departure airport and that enables the user to select the first candidate departure airport for the client-initiated segment;

a first candidate destination airport control that depicts a first destination airport identifier for a first candidate destination airport and that enables the user to select the first candidate destination airport for the client-initiated segment; and additional airport selection controls including, for each of a plurality of additional candidate airports that comprises additional candidate departure airports and additional candidate destination airports, an additional airport selection control for selecting a corresponding additional candidate airport for the client-initiated segment, wherein each additional airport selection control depicts (i) an airport identifier for the corresponding additional candidate airport and (ii) an additional required amount that is required to be submitted by a creator of the client-initiated segment if the corresponding additional candidate airport is selected for the client-initiated segment, wherein the additional required amount for each corresponding additional candidate airport is an offset from a base required amount for the first candidate departure airport or the first candidate destination airport if the corresponding additional candidate airport is selected for the client-initiated segment using the additional airport selection control for the corresponding additional candidate airport, wherein the additional required amount depicted by a respective airport selection control for an additional candidate departure airport or an additional candidate destination airport of the plurality of additional candidate airports comprises a respective amount that is added to or subtracted from the base required amount for the first candidate departure airport or the first candidate destination airport to determine a total amount for the client-initiated segment when the additional candidate departure airport is selected for the client-initiated segment;

ranking, by the one or more processors, (i) the additional candidate departure airports according to the additional required amount for each additional candidate departure airport and (ii) the additional candidate destination airports according to the additional required amount for each additional candidate destination airport;

displaying, by the one or more processors, (i) the airport selection controls associated with the additional departure candidate airports in a vertical manner under the first candidate departure airport according to the ranking of the additional candidate departure airports and (ii) the airport selection controls associated with the additional destination candidate airports in a vertical manner under the first candidate destination airport according to the ranking of the additional candidate destination airports;

displaying, by the one or more processors, a map interface that illustrates (i) a map of a departure geographic region, (ii) the airport selection controls associated with the additional departure candidate airports on the map at locations of the departure candidate airports, and (iii) the additional required amount for each additional candidate departure airport from the first candidate departure airport;

detecting user interaction with a given airport selection control on the map interface, wherein the given airport selection control corresponds to a second candidate departure airport different from the first candidate departure airport;

updating, by the one or more processors and on the map interface, the additional required amount offset for each additional candidate departure airport from an amount required for the departure candidate airport associated with the given airport selection control;

in response to detecting the user interaction with the given airport selection control, assigning the second candidate airport for the given airport selection control to the client-initiated segment;

creating the client-initiated segment with a scheduled departure from the second candidate departure airport and a scheduled arrival at a destination airport corresponding to a selected airport selection control; and enabling one or more additional clients to claim spots on the created client-initiated segment.

2. The computer-implemented method of claim 1, wherein detecting the user interaction with the given airport selection control comprises detecting user interaction with the respective airport selection control for a given additional candidate departure airport, the computer-implemented method further comprising:

updating the user interface to present:

the first candidate departure airport control for selecting the first candidate departure airport, the first candidate departure airport control depicting the first departure airport identifier and a first additional required amount that is an amount below a sum of the base required amount and the additional required amount for the given additional candidate departure airport; and an updated additional required amount for each other airport selection control for an additional departure airport control.

3. The computer-implemented method of claim 1, wherein detecting the user interaction with the given airport selection control comprises detecting user interaction with the respective airport selection control for a given additional candidate destination airport, the computer-implemented method further comprising:

updating the user interface to present:

the first candidate destination airport control for selecting the first candidate destination airport, the first candidate destination airport control depicting the first destination airport identifier and a first additional required amount that is an amount below a sum of the base required amount and the additional required amount for the given additional candidate destination airport; and an updated additional required amount for each other airport selection control for an additional candidate destination airport.

4. The computer-implemented method of claim 1, wherein receiving the selection data comprising the departure geographic identifier and the destination geographic identifier comprises:

presenting the user interface enabling the creator of the client-initiated segment to select the departure geographic identifier and the destination geographic identifier; and in response to receiving the selection data comprising the departure geographic identifier and the destination geographic identifier, presenting a second user interface enabling the creator to select a departure date for the client-initiated segment, wherein the second user interface comprises a calendar interface that presents a plurality of dates and, for each date, a minimum base required amount for creating the client-initiated segment to depart from a departure airport to a destination airport on the date.

5. The computer-implemented method of claim 4, further comprising:

detecting user interaction with a given date in the calendar interface; and in response to detecting the user interaction with the given date in the calendar interface, presenting a third user interface for selecting a type of jet for the client-initiated segment, wherein the third user interface presents, for each type of jet, a base required amount for using the type of jet to travel from the departure airport to the destination airport on the given date.

6. The computer-implemented method of claim 5, wherein updating a user interface comprises updating the third user interface to present a customization interface that presents the first departure airport identifier, the first destination airport identifier, and the airport selection controls.

7. The computer-implemented method of claim 1, wherein the additional required amount that is required to be submitted by the creator of the client-initiated segment is the offset from the base required amount for the first candidate departure airport further comprises the additional required amount being an amount greater than the base required amount for the first candidate departure amount.

8. The computer-implemented method of claim 1, wherein the additional required amount that is required to be submitted by the creator of the client-initiated segment is the offset from the base required amount for the first candidate departure airport further comprises the additional required amount being an amount less than the base required amount for the first candidate departure amount.

9. The computer-implemented method of claim 1, further comprising:

in response to detecting the user interaction with the given airport selection control updating the user interface to highlight the given airport selection control with a first color and highlight with a second color the remaining one or more airport selection controls, wherein the first color is different from the second color.

10. The computer-implemented method of claim 1, further comprising:

receiving the additional required amount that is to be submitted by the creator of the client-initiated segment; and in response to receiving the additional required amount:

scheduling the client-initiated segment causing the client-initiated segment to depart from the second candidate departure airport at a scheduled departure time and arrive at the destination airport corresponding to the selected airport selection control at a scheduled arrival time.

11. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

receiving, via a user interface displayed at a client device of a user, selection data indicating a user selection to view departure airports and destination airports for a new client-initiated segment, wherein the selection data comprises a departure geographic identifier that identifies a departure geographic location from which a client-initiated segment will depart and a destination geographic identifier that identifies a destination geographic location at which the client-initiated segment will arrive;

identifying a set of candidate departure airports and a set of candidate destination airports based on a set of criteria comprising (i) respective required amounts for each candidate departure airport and each candidate destination airport and (ii) location information for each candidate departure airport and each candidate destination airport;

generating airport selection controls for the candidate departure airports and the candidate destination airports, the airport selection control for each candidate airport being a user interface control that enables a user to select a candidate airport for the client-initiated segment, the airport selection controls comprising:
- a first candidate departure airport control that depicts a first departure airport identifier for a first candidate departure airport and that enables the user to select the first candidate departure airport for the client-initiated segment;
- a first candidate destination airport control that depicts a first destination airport identifier for a first candidate destination airport and that enables the user to select the first candidate destination airport for the client-initiated segment; and
- additional airport selection controls including, for each of a plurality of additional candidate airports that comprises additional candidate departure airports and additional candidate destination airports, an additional airport selection control for selecting a corresponding additional candidate airport for the client-initiated segment, wherein each additional airport selection control depicts (i) an airport identifier for the corresponding additional candidate airport and (ii) an additional required amount that is required to be submitted by a creator of the client-initiated segment if the corresponding additional candidate airport is selected for the client-initiated segment, wherein the additional required amount for each corresponding additional candidate airport is an offset from a base required amount for the first candidate departure airport or the first candidate destination airport if the corresponding additional candidate airport is selected for the client-initiated segment using the additional airport selection control for the corresponding additional candidate airport, wherein the additional required amount depicted by a respective airport selection control for an additional candidate departure airport or an additional candidate destination airport of the plurality of additional candidate airports comprises a respective amount that is added to or subtracted from the base required amount for the first candidate departure airport or the first candidate destination airport to determine a total amount for the client-initiated segment when the additional candidate departure airport is selected for the client-initiated segment;

ranking, by the one or more processors, (i) the additional candidate departure airports according to the additional required amount for each additional candidate departure airport and (ii) the additional candidate destination airports according to the additional required amount for each additional candidate destination airport;

displaying a map interface that illustrates (i) a map of a departure geographic region, (ii) the airport selection controls associated with the additional departure candidate airports on the map at locations of the departure candidate airports, and (iii) the additional required amount for each additional candidate departure airport from the first candidate departure airport;

detecting user interaction with a given airport selection control on the map interface, wherein the given airport selection control corresponds to a second candidate departure airport different from the first candidate departure airport;

updating, on the map interface the additional required amount offset for each additional candidate departure airport from an amount required for the departure candidate airport associated with the given airport selection control;

in response to detecting the user interaction with the given airport selection control, assigning the second candidate airport for the given airport selection control to the client-initiated segment;

creating the client-initiated segment with a scheduled departure from the second candidate departure airport and a scheduled arrival at a destination airport corresponding to a selected airport selection control; and enabling one or more additional clients to claim spots on the created client-initiated segment.

12. The computer-implemented system of claim 11, wherein detecting the user interaction with the given airport selection control comprises detecting user interaction with the respective airport selection control for a given additional candidate departure airport, the operations further comprising:
updating the user interface to present:
- the first candidate departure airport control for selecting the first candidate departure airport, the first candidate departure airport control depicting the first departure airport identifier and a first additional required amount that is an amount below a sum of the base required amount and the additional required amount for the given additional candidate departure airport; and
- an updated additional required amount for each other airport selection control for an additional departure airport control.

13. The computer-implemented system of claim 11, wherein detecting the user interaction with the given airport selection control comprises detecting user interaction with the respective airport selection control for a given additional candidate destination airport, the operations further comprising:
updating the user interface to present:
- the first candidate destination airport control for selecting the first candidate destination airport, the first candidate destination airport control depicting the first destination airport identifier and a first additional required amount that is an amount below a sum of the base required amount and the additional required amount for the given additional candidate destination airport; and
- an updated additional required amount for each other airport selection control for an additional candidate destination airport.

14. The computer-implemented system of claim 11, wherein receiving the selection data comprising the departure geographic identifier and the destination geographic identifier comprises:

presenting the user interface enabling the creator of the client-initiated segment to select the departure geographic identifier and the destination geographic identifier; and in response to receiving the selection data comprising the departure geographic identifier and the destination geographic identifier, presenting a second user interface enabling the creator to select a departure date for the client-initiated segment, wherein the second user interface comprises a calendar interface that presents a plurality of dates and, for each date, a minimum base required amount for creating the client-initiated segment to depart from a departure airport to a destination airport on the date.

15. The computer-implemented system of claim 14, wherein the operations comprise:

detecting user interaction with a given date in the calendar interface; and in response to detecting the user interaction with the given date in the calendar interface, presenting a third user interface for selecting a type of jet for the client-initiated segment, wherein the third user interface presents, for each type of jet, a base required amount for using the type of jet to travel from the departure airport to the destination airport on the given date.

16. The computer-implemented system of claim 15, wherein updating a user interface comprises updating the third user interface to present a customization interface that presents the first departure airport identifier, the first destination airport identifier, and the airport selection controls.

17. A non-transitory computer storage medium encoded with a computer program, the program comprising instructions that when executed by data processing apparatus cause the data processing apparatus to perform operations comprising:

receiving, via a user interface displayed at a client device of a user, selection data indicating a user selection to view departure airports and destination airports for a new client-initiated segment, wherein the selection data comprises a departure geographic identifier that identifies a departure geographic location from which a client-initiated segment will depart and a destination geographic identifier that identifies a destination geographic location at which the client-initiated segment will arrive;

identifying a set of candidate departure airports and a set of candidate destination airports based on a set of criteria comprising (i) respective required amounts for each candidate departure airport and each candidate destination airport and (ii) location information for each candidate departure airport and each candidate destination airport;

generating airport selection controls for the candidate departure airports and the candidate destination airports, the airport selection control for each candidate airport being a user interface control that enables a user to select a candidate airport for the client-initiated segment, the airport selection controls comprising:

a first candidate departure airport control that depicts a first departure airport identifier for a first candidate departure airport and that enables the user to select the first candidate departure airport for the client-initiated segment;

a first candidate destination airport control that depicts a first destination airport identifier for a first candidate destination airport and that enables the user to select the first candidate destination airport for the client-initiated segment; and additional airport selection controls including, for each of a plurality of additional candidate airports that comprises additional candidate departure airports and additional candidate destination airports, an additional airport selection control for selecting a corresponding additional candidate airport for the client-initiated segment, wherein each additional airport selection control depicts (i) an airport identifier for the corresponding additional candidate airport and (ii) an additional required amount that is required to be submitted by a creator of the client-initiated segment if the corresponding additional candidate airport is selected for the client-initiated segment, wherein the additional required amount for each corresponding additional candidate airport is an offset from a base required amount for the first candidate departure airport or the first candidate destination airport if the corresponding additional candidate airport is selected for the client-initiated segment using the additional airport selection control for the corresponding additional candidate airport, wherein the additional required amount depicted by a respective airport selection control for an additional candidate departure airport or an additional candidate destination airport of the plurality of additional candidate airports comprises a respective amount that is added to or subtracted from the base required amount for the first candidate departure airport or the first candidate destination airport to determine a total amount for the client-initiated segment when the additional candidate departure airport is selected for the client-initiated segment;

ranking (i) the additional candidate departure airports according to the additional required amount for each additional candidate departure airport and (ii) the additional candidate destination airports according to the additional required amount for each additional candidate destination airport;

displaying (i) the airport selection controls associated with the additional departure candidate airports in a vertical manner under the first candidate departure airport according to the ranking of the additional candidate departure airports and (ii) the airport selection controls associated with the additional destination candidate airports in a vertical manner under the first candidate destination airport according to the ranking of the additional candidate destination airports;

displaying a map interface that illustrates (i) a map of a departure geographic region, (ii) the airport selection controls associated with the additional departure candidate airports on the map at locations of the departure candidate airports, and (iii) the additional required amount for each additional candidate departure airport from the first candidate departure airport;

detecting user interaction with a given airport selection control on the map interface, wherein the given airport selection control corresponds to a second candidate departure airport different from the first candidate departure airport;

updating, on the map interface, the additional required amount offset for each additional candidate departure airport from an amount required for the departure candidate airport associated with the given airport selection control;

in response to detecting the user interaction with the given airport selection control, assigning the second candidate airport for the given airport selection control to the client-initiated segment;

creating the client-initiated segment with a scheduled departure from the second candidate departure airport and a scheduled arrival at a destination airport corresponding to a selected airport selection control; and enabling one or more additional clients to claim spots on the created client-initiated segment.

* * * * *

UNITED STATES PATENT AND TRADEMARK OFFICE
CERTIFICATE OF CORRECTION

PATENT NO. : 12,299,607 B1  
APPLICATION NO. : 17/482739  
DATED : May 13, 2025  
INVENTOR(S) : Mikhail Kirsanov Page 1 of 1

It is certified that error appears in the above-identified patent and that said Letters Patent is hereby corrected as shown below:

In the Claims

Column 24, Line 11: In Claim 11, after "interface" insert -- , --.

Signed and Sealed this  
Twenty-fourth Day of June, 2025

Coke Morgan Stewart  
*Acting Director of the United States Patent and Trademark Office*